Figure 1:
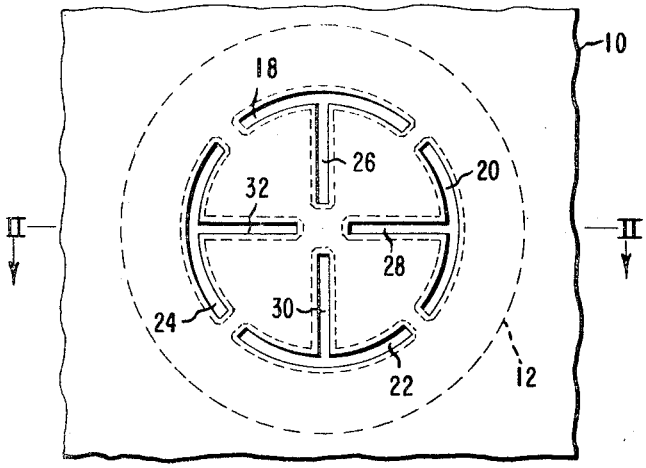
Figure 3:
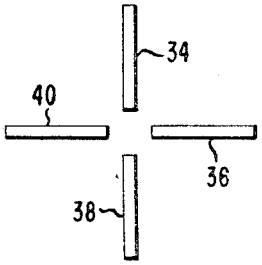
Figure 2:
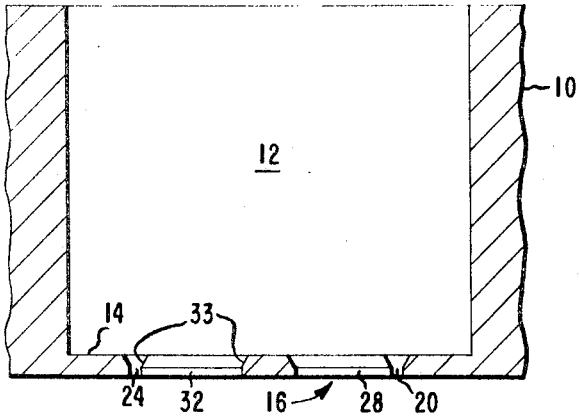
Figure 4:
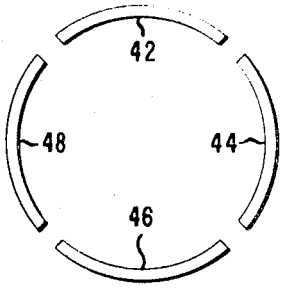
Figure 5:
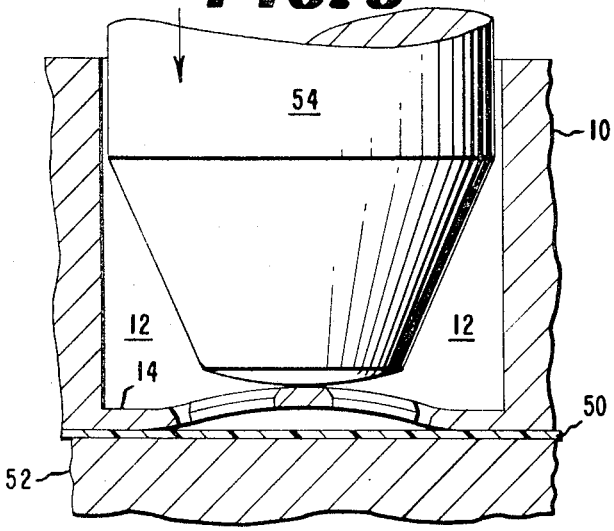

T866021

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED SEPTEMBER 16, 1969

866 O.G. 703

811,338
FABRICATION METHOD

James Stanley Cobb, Jr., Martinsville, Va., assignor to E. I. du Pont de Nemours and Company, Wilmington, Del., a corporation of Delaware

Filed Mar. 28, 1969. Published Sept. 16, 1969
Int. Cl. B21k *5/20;* D01d
U.S. Cl. 76—107
1 Sheet Drawing. 8 Pages Specification

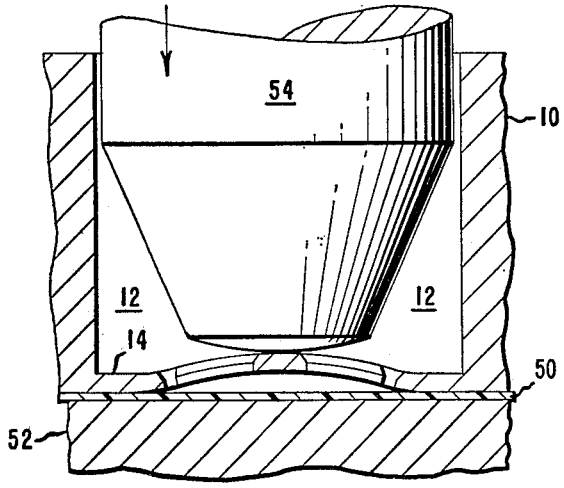

A method of fabricating minute capillaries which extend from counterbores in one side to complex, slotted orifices in the other side of a spinneret plate. Each orifice is segmented and each segment has peripheral and radial slots. After forming a countersink of the same configuration as an orifice in the bottom of a counterbore, the radial and peripheral slots are punched in two steps which leave the plate dished into the counterbore. Oversized punches are used but uniform slots of the desired size are achieved simply by pushing into the counterbore with a pin to flatten the area which had been dished in the punching steps.

T866021

Sept. 16, 1969

J. S. COBB, JR 811,338
DEF. PUB.

FABRICATION METHOD

Filed March 28, 1969